United States Patent [19]

Prudhon

[11] Patent Number: 4,931,012
[45] Date of Patent: Jun. 5, 1990

[54] PHASE CONTACTOR/PROCESS FOR GENERATING HIGH TEMPERATURE GASEOUS PHASE

[75] Inventor: Francois Prudhon, Versailles, France

[73] Assignee: Rhone-Poulenc Chimie de Base, Courbevoie, France

[21] Appl. No.: 349,922

[22] Filed: May 9, 1989

Related U.S. Application Data

[63] Continuation of Ser. No. 948,007, Dec. 31, 1986, abandoned.

[30] Foreign Application Priority Data

Jan. 2, 1986 [FR] France ................................ 86 00009

[51] Int. Cl.$^5$ ......................... F23M 9/00; F23D 14/12
[52] U.S. Cl. ........................................ 431/9; 431/10; 431/12; 431/347
[58] Field of Search ..................... 431/8, 9, 10, 12, 5, 431/160, 347, 353, 114

[56] References Cited

U.S. PATENT DOCUMENTS

| | | | |
|---|---|---|---|
| 2,348,422 | 5/1944 | Schaefer | 431/347 X |
| 2,368,827 | 2/1945 | Hanson et al. | 431/9 X |
| 2,850,875 | 9/1958 | Gahwyler . | |
| 3,145,076 | 8/1964 | Reichert et al. | 431/9 |
| 3,758,081 | 9/1973 | Prudhon . | |
| 4,021,186 | 5/1977 | Tenner | 431/10 |
| 4,086,099 | 4/1978 | Prudhon et al. . | |
| 4,124,353 | 11/1978 | Prudhon et al. . | |
| 4,257,339 | 3/1981 | Prudhon et al. . | |
| 4,263,234 | 4/1981 | Prudhon et al. . | |
| 4,265,702 | 5/1981 | Prudhon et al. . | |
| 4,267,131 | 5/1981 | Prudhon et al. . | |
| 4,334,919 | 6/1982 | Queneau et al. | 431/9 X |
| 4,350,101 | 9/1982 | Prudhon et al. . | |
| 4,447,331 | 5/1984 | Prudhon et al. . | |
| 4,526,529 | 7/1985 | Bernard et al. | 431/9 |
| 4,562,778 | 1/1986 | Bernard et al. . | |

FOREIGN PATENT DOCUMENTS

| | | |
|---|---|---|
| 128792 | 12/1984 | European Pat. Off. . |
| 1191703 | 10/1959 | France . |
| 2058818 | 5/1971 | France . |
| 2249585 | 5/1975 | France . |
| 2257326 | 8/1975 | France . |
| 2286104 | 4/1976 | France . |
| 2419969 | 10/1979 | France . |
| 2580953 | 10/1986 | France . |

Primary Examiner—Randall L. Green
Attorney, Agent, or Firm—Burns, Doane, Swecker & Mathis

[57] ABSTRACT

A phase contactor adopted, e.g., for combustion and pollution control, comprises a mixing zone and means for separately injecting and disintegrating at least two gaseous flowstreams therein, a central element within said mixing zone defining an annular space into which said gaseous flowstreams are injected and disintegrated, and a downstream reaction zone.

14 Claims, 2 Drawing Sheets

PHASE CONTACTOR/PROCESS FOR GENERATING HIGH TEMPERATURE GASEOUS PHASE

This application is a continuation, of Application Ser. No. 06/948,007, filed Dec. 31, 1986, abandoned.

BACKGROUND OF THE INVENTION

1. Field of the Invention

The present invention relates to process/apparatus for producing a gaseous phase at high temperatures.

This invention also relates to the use of such process/apparatus for carrying out reactions at high temperatures in the gaseous phase and/or under the influence of said gaseous phase in order to either produce various final products, or to treat liquid or gaseous phases which may or may not be charged with solids and atomizable solids, for example, in the treatment of polluted effluents.

2. Description of the Prior Art

In this art, high-temperature reactions utilizing media comprising at least one gaseous phase have become increasingly used for purposes as varied, for example, as generating hot gases or superheated steam, the hydrogenation of a sprayed carbonaceous material, or the gasification or treatment of effluents for pollution control.

One obstacle encountered is the difficulty of complying both with very severe chemical requirements and with major technological constraints. In fact, the temperature of the resulting gaseous phase must generally be raised rapidly and in a uniformly distributed manner to values of greater than 1000° C. It too is known that the temperature range of from 800° to 1000° C. defines a highly critical area, since it is favorable to the formation of undesirable materials such as dioxin (chlorinated compounds) or tarry materials (gasification). It is appropriate, therefore, to not only operate above such range, but also to pass through it without suffering harmful consequences.

Moreover, from a technological point of view, the practical limit for use of conventional steels is generally around 800° C.

Such requirements, in and of themselves, virtually exclude using processes of the fluidized bed type and they also explain the attraction to apparatuses which are referred to as entrained bed-type apparatuses, or entrained flow-type apparatuses. See, for example, published French Application No. 2,419,969 or published French Application No. 2,286,104.

It will readily be appreciated that it is not possible to envisage the formation of a region which is totally homogeneous in respect of temperature, in this context, as that situation presupposes excessively high reactor wall temperatures.

It is for this reason that the '969 application proposed using the technology referred to as "rocket motor technology" (see, for example, published French Application No. 2,419,969, at pages 10 and 11). In accordance therewith, a layer referred to as the boundary layer is established at the location of the reactor walls by means of a gaseous compound (in the present case, hydrogen) which has not reacted, to thereby form a "protective barrier". Such arrangement cannot be used when the reactions are to be carried out, for example, utilizing essentially stoichiometric amounts of reactants.

In published French Application No. 84.11002, assigned to the assignee hereof, a solution was proposed based on a completely different concept, whereby the respective gas flows are injected into a mixing zone by pre-dividing each flowstream and forming repetitive units of elementary mixtures from said pre-divided flows, which results in very rapid and isodistributed mixing, permitting table reactions at high temperature.

Although that method generally gave good results, deposits of carbon may occasionally be detected on the wall surfaces, in particular when carrying out the combustion of hydrocarbons in the gaseous state under conditions involving a deficiency of combustion-supporting environment.

Of course, the goal of the very rapid and isodistributed mixing effect is to permit reactions to be carried out at very high temperatures.

It was also determined by the assignee hereof that, by maintaining the walls at a sufficiently low temperature, it was possible to avoid the deposition of, for example, carbon, without adversely affecting the quality of combustion (or the reaction).

It has now been determined that, in contrast to the situation wherein the presence of a cold or cooled wall in the vicinity of the combustion zone or the reaction zone was harmful, it was possible under certain conditions to realize the benefit of the advantages of a reaction zone at elevated temperature, while avoiding the disadvantages involved in the presence of a zone having a cold wall: the phenomenon involving pinching of the flame, incomplete and/or parasitic reactions and/or wall deposits, substantial heat losses giving rise to local absence of homogeneity in the products of the reaction.

SUMMARY OF THE INVENTION

Accordingly, a major object of the present invention is the provision of improved process/apparatus comprising flame action and/or a reaction zone which are quite limited, very hot, homogeneous in respect of composition and exhibiting a low level of thermal inertia.

Briefly, the present invention features process/apparatus comprising a zone for contacting at least two compounds in gaseous form, effecting an exothermic reaction, wherein at least two separate gas flowstreams are injected into a mixing zone where, by pre-dividing each flow, elementary units of volume are formed from said pre-divided flowstreams, as is a reaction zone, and characteristically wherein the mixing zone has at least one stage for distribution of at least one gaseous compound around a central zone which is separated from said mixing zone and said reaction zone, such as a combustion zone.

Advantageously, an overall entrainment effect is imparted to the elementary units or mixtures, from at least one of the flowstreams serving to form the elementary units or mixtures.

Thus, a homogeneous assembly of homogeneous elementary mixtures is established, resulting from the aforesaid elementary units before commencement of the reaction (which is all the quicker in that it occurs between gases), in local proportions which are approximately stoichiometric, corresponding to the maximum reaction speeds. The homogeneous elementary mixtures must thus be produced in a period of time which is all the shorter as the reaction is faster.

The gases being available upstream of the apparatus at a given pressure and, therefore, at a defined injection speed, the elementary mixtures are produced all the faster, as they are produced on a small scale.

The range of a jet issuing from an orifice being proportional to the diameter of the orifice and independent of the flow rate, the repetitive units for generating elementary mixtures will advantageously be formed by closely spaced orifices of small sizes.

In practice, in a simple fashion, each gas flow is pre-divided by means of repetitive injection units, such as pairs of adjacent orifices.

DETAILED DESCRIPTION OF THE PREFERRED EMBODIMENTS OF THE INVENTION

Figure 1:
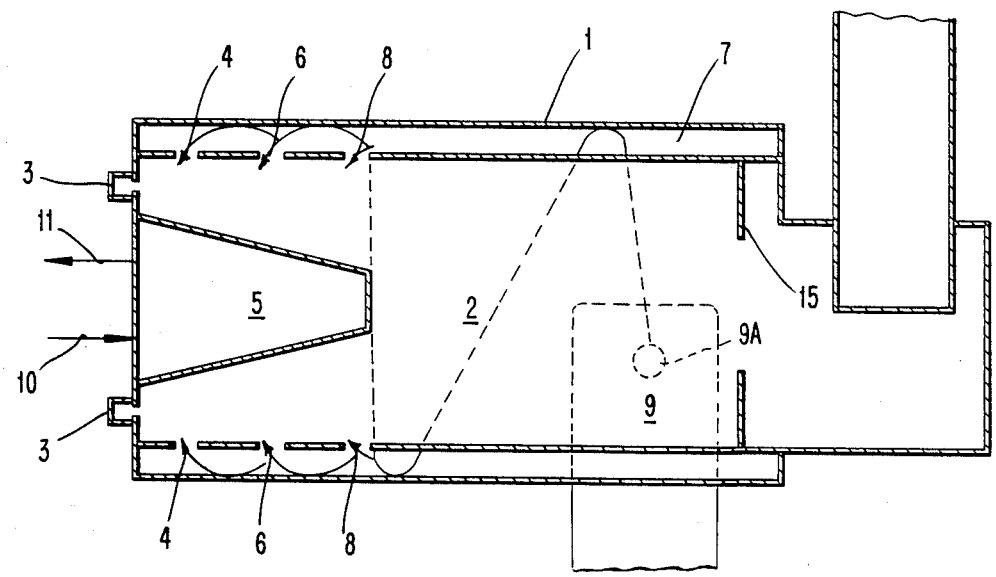
FIG. 1 is an axial, diagrammatical cross-sectional view of one embodiment of a phase contactor according to the invention.

More particularly according to the present invention, the aforesaid injection units which are repetitive from a geometrical point of view, must also be repetitive from a hydrodynamic point of view, thus guaranteeing equal distribution of the flowstreams. Advantageously, that effect is achieved by imparting to the rate of ejection Ve of a gas through the orifices which are allocated thereto in said repetitive units, a value which is equal to at least three times and preferably six times the value of the speed of distribution Vd upstream of said orifices, in the case of air, under normal conditions in respect of temperature and pressure. Thus produced is a homogeneous assembly of homogeneous elementary mixtures in a state of mixing comparable to that observed at the discharge of the delayed effect zone in the case of gas/liquid mixtures.

The process advantageously entails imparting to at least one of said flowstreams a symmetrical helical swirl or vortex movement at a sufficient flow rate thereof to entrainment of the other gaseous flowstream (or the other gaseous flowstreams).

Then, disposed downstream is a confinement zone such as to effect rotary movement of the flow around the axis of the subsequent discharge flow, thus performing the overall entrainment function.

Such operation makes it possible to provide very rapid mixing, on the scale of the apparatus, of the elementary mixtures generated as a function of the repetitive injection units, while providing for commencing reaction without omission or repetition, hence providing a very high level of density of reactions, since they are carried out in a total reaction volume which has been reduced to a minimum.

This results in the production of a flame (or a reaction zone) which is very short and of high intensity, and the establishment of very high local temperatures.

Overall, it can be considered that the two functions, mixing and then reaction, are separated over a small distance corresponding to a very short period of time, the gases being subjected to successive treatments, each of which being homogeneous, which on an overall basis constitutes an evolutionary procedure of plug flow type.

The aforementioned separation of functions is governed by the creation of the noted central zone which is separated in material terms from the combustion zone.

The gaseous phases are supplied in concentric relationship, with the possibility of staggering the feed of at least one of the two phases.

Advantageously, the central zone is also cooled.

Surprisingly, it is found that the sound level produced is low, permitting the process to be applied to domestic uses. It is thought that this result is due to the fact that recycling of the gaseous phase disposed downstream of the central zone is prevented by virtue of the central zone being completely filled by a core element.

In one embodiment of the invention, one gaseous phase is constituted by a fuel and the other by a combustion-supporting agent, such as by successive coaxial supply rings. The supply technique is such that the first stage corresponds to a deficiency of combustion-supporting agent, and the second stage makes it possible to achieve and even exceed stoichiometry. It is optionally possible to provide other dilution stages. The central zone or core therefore delimits a ring zone in which combustion initially occurs with an excess of fuel or combustible material, comprising, for example, a large number of complementary injection pairs for the fuel gas and combustion-supporting air. Each pair creates a homogeneous elementary mixture, or unit volume, where the initial elementary flame is produced and where the local partial pressure of inert materials is at a minimum (local absence of recirculation of burned gases), which is a first factor that contributes to the high speed of the reaction.

From the second line of injection of combustion-supporting agent (air), the process locally progresses through the temperature maximum (stoichiometry) and therefore the reaction speed maximum and thus a "flame return", the latter speed being further increased by local turbulence in line with the above-mentioned pairs. That array of phenomena accentuates local stability of the flame.

The subsequent lines of holes, if provided, correspond to a dilution action, the effect of which is to reduce the overall temperature and to accentuate the kinetic motion of the entirely of the reaction mass. The latter phenomenon causes the recycling movement which here has an overall stabilizing effect on the hot zone on the cooled bottom or base of the apparatus.

The process of the invention is thus based on a concept which makes it possible to enhance the stability and flexibility of an intensive gas/gas reactor.

Such concept can be carried out in a process referred to as vaporizing atomization, as described in EP-A128,792.

It is known that a major problem involved in burning heavy fuels is that of clean combustion, that is to say, combustion without ultimate emission of carbonaceous particles.

In accordance with EP-A-128,792, this process comprises:

(i) introducing a gaseous combustion-supporting flowstream into a first zone along helical paths which are symmetrical with respect to their common axis and introducing a flowstream of combustible fluid such as to produce a first dispersing combustion phase, (ii) forcing the resulting flowstream through a restricted passage into a second zone such as to impart thereto the form of a symmetrical axial flow/vortex flow configuration, (iii) introducing the combustible substance to be treated into the axial zone which is in a condition of relative depression of said symmetrical axial flow/vortex flow configuration and providing a second combustion action by means of a second gaseous fuel flow into the second zone, the amounts of combustion-supporting and fuel gas introduced into the first zone being sufficient to effect, in addition to dispersion thereof, vaporization of the substance to be treated on entering the second zone.

That process assumes that, in order to be successful, a very hot gaseous phase is produced.

The process according to the invention can advantageously be used to produce that gaseous phase in the first step of the process referred to as the vaporizing atomization process.

It will be appreciated that the process of the invention is applicable to all situations involving burning or reaction of materials at elevated temperature, whether they are in gaseous, liquid or atomizable solid form.

It is particularly applicable to a suspension of atomizable solid materials, such as carbon, lignites or equivalent, whether the suspensions are in the form of solids in suspension in a gaseous phase, or pumpable suspensions in a liquid or organic phase, and whether the area of application is that of incineration, for example in the case of anti-pollution measures, or the field of chemistry in the case of production of synthesis gas, for example.

In the case of materials such as hydrocarbons which can give rise to undesirable decomposition products and the formation of deposits, the walls which define the mixing zone and the zone in which the reaction begins may be maintained at a sufficiently low temperature as to practically avoid local decomposition of the products of the reaction.

The process of the invention permits miniaturization of the apparatus, with reduced wall effects, thus providing effective thermal protection by cooling of said walls without a significant harmful effect on the mean temperature of the reaction and on the level of selectivity thereof.

With specific reference to the accompanying Figures of Drawing, the apparatus according to the invention, in FIG. 1, comprises:

(1) a casing 1 into which opens the gas feed means, the arrays of gas injection means being disposed such as to define repetitive units 3, 4, etc.;

(2) the apparatus being characterized in that a rigid element or core 5 is provided within the chamber 2, the gas feeds 3, 4, etc., opening into the annular zone defined by said rigid element core 5.

Advantageously, one gaseous phase is supplied via tangential inlet 9, for example, by means of a hole 9A which communicates the conduit 9 with an annular space 7. That gaseous phase is charged into the chamber 2 by means of at least two arrays of perforations, or orifices 4, 6 and 8. The other gaseous phases is supplied by orifices 3.

In one embodiment of the invention, the feed of the gaseous phase by way of the inlet perforations 4 is such that the elementary mixtures constituted by the feeds 3 and 4 establish a feed which has a deficiency in respect of the phase 4, relative to stoichiometry. The make-up amount of the second phase stoichiometrically required is provided by the inlet perforations 6, 8, etc.

It will be appreciated that the apparatus according to the invention may comprise more than three families or complementary arrays of orifices.

On the other hand, it is clear that an array of perforations may be replaced by a slot (a means which is functionally equivalent to a ring of holes), more particularly at the site of the stages which provide the dilution effect (perforations 8, for example).

In the illustrated embodiment, the orifices are distributed as rings of holes and the core 5 is cooled by a circulation of cooling fluid via lines 10 and 11.

Optionally, the apparatus may be provided with a diaphragm 15 within the chamber 2.

Figure 2:
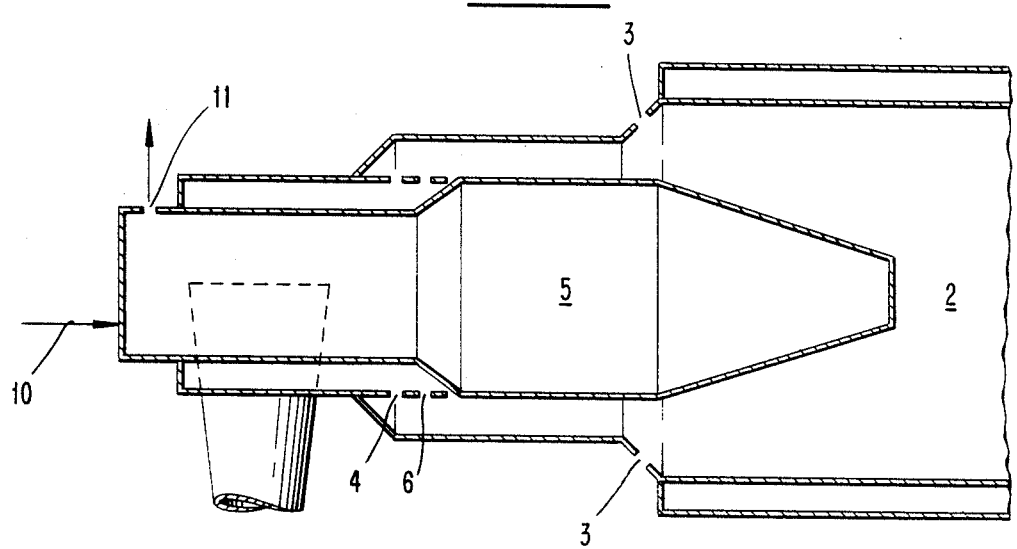
FIGS. 2-5 are each axial, diagrammatical cross-sectional views of other embodiments of phase contactors according to the invention.

FIG. 2 illustrates another embodiment of the invention. In FIG. 2, at least one array of gas inlets is provided not by centripetal injection, but by centrifugal injection.

This form of operation is particularly well suited for the treatment of gases charged with solid particles, which is generally the case with polluted gases.

Figure 3:
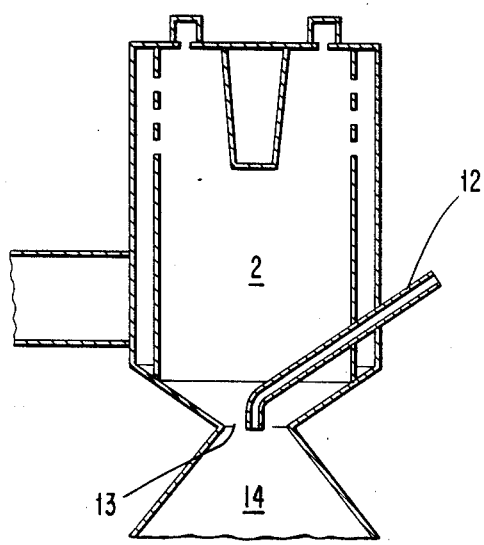
Figure 4:
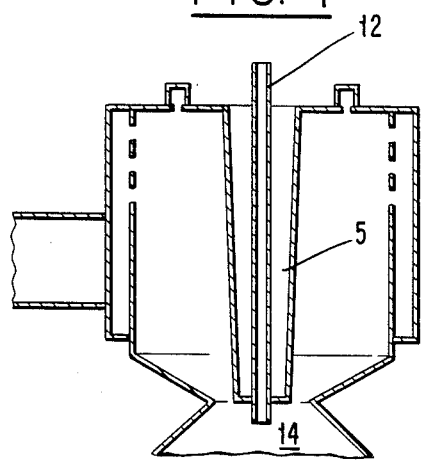

FIGS. 3 and 4 illustrate other embodiments of the invention, designed for the treatment of a liquid phase which either may or may not be charged with solid matter, or a solid matter supplied in atomizable form.

In the embodiment illustrated in FIG. 3, a third fluid (axial phase) is supplied by means of the inlet tube 12 which is advantageously also cooled, and which opens in the vicinity of the plane of the zone of restricted flow passage 13 at the outlet of chamber 2, to impart the configuration of an axially symmetrical helical vortex flow to the gases issuing from the chamber 2. The third fluid may be gaseous or liquid, possibly charged, and it may be atomized in zone 14 by transfer of the mechanical and thermal energy of the gases (3+4) which have reacted, said gases having attained a level of momentum upon inlet at 15 of at least 100 times that of the axial phase (tube 12) and advantageously from 1000 to 10,000 times the value thereof when said axial phase is liquid or in the form of atomizable suspensions, such conditions causing the axial phase to be dispersed, then entrained in and treated by the gaseous phase issuing from chamber 2, under the conditions generally described in French Patents Nos. 2,257,326 and 2,058,818, assigned to the assignee hereof. Cf. U.S. Pat. Nos. 3,758,081, 4,086,099, 4,124,353, 4,257,339, 4,263,234, 4,265,702, 4,267,131, 4,350,101, 4,447,331 and 4,562,778, also assigned to the assignee hereof.

It is possible for a plurality of fluids which are introduced coaxially to be supplied to zone 14 by way of chamber 12.

One particular treatment carried out in such manner in zone 14 is what has been identified above as being vaporizing atomization, an organized combination in the flow which is confined in zone 14, referred to as an "axially symmetrical helical vortex flow configuration", of the mechanical and thermal effects of the gaseous phase on the generally liquid axial phase.

FIG. 4 illustrates another embodiment in which the gaseous, liquid or solid axial phase to be treated is introduced, wherein the tube or pipe 12 is axial and extends through the rigid element or core 5.

When the axial phase is gaseous, a particularly advantageous arrangement of the downstream end of the inlet tube 12 permits pre-division of the jet of the axial phase.

The process and the apparatus according to the invention can be used for many applications, in particular in the following areas:

(1) Depolution: whether the polluted effluent to be treated is in gaseous, liquid or solid phase. In the first case, the effluent gas will advantageously be supplied in the form of a flowstream which is delivered tangentially, if at the same time it performs the function of a principal combustion-supporting agent or medium (for example, polluted air).

In the case of a liquid or an atomizable solid, the effluent will be supplied axially, as for an inert or combustible gas. In the latter case, it will also be possible to use the orifices 3.

An example illustrating the advantages of the process according to the invention is in the incineration of chlorinated residues.

The standards which are applicable in this respect at the present time recommend and indeed require that combustion should take place with a substantial excess of air. In accordance with the same standards, the fumes and smoke resulting from that combustion must themselves contain an excess of air.

That requirement clearly reflects the fact that there is no satisfactory solution to the problem at hand.

In fact, such requirement presupposes that the oxygen partial pressure is increased, giving rise to a number of troublesome consequences, as follows:

(a) firstly, a reduction in temperature to a relatively low value; and (b) also, the formation of gaseous impurities such as $NO_x$ (by virtue of the larger amount of nitrogen which is introduced at the same time as the excess of oxygen) and $Cl_2$, at a temperature which can promote the formation of polluting impurities, such as dioxin.

The invention thus permits operation running counter to that procedure which has been ratified by de facto or de jure standardization.

In this precise situation, according to the invention, by virtue of initial mixing utilizing a stoichiometric deficiency of oxygen, followed by essentially stoichiometric combustion in a generally gaseous phase e.g., by, means of an igniter located adjacent the ports 8, it is possible to effect incineration at high temperatures with an oxygen partial pressure which is significantly lower than that heretofore used in this art.

Moreover, it is possible in accordance with the invention to introduce water vapor, the water vapor performing a dual function, i.e., as a supply of heat energy on the one hand and as a means for affecting reaction equilibria on the other.

Thus, the disadvantage of the prior art is avoided in that the supply of heat energy is provided by an excess of air, therefore entailing the introduction in particular of nitrogen and the formation of $NO_x$, and, for example, the Deacon equilibrium is shifted towards HCl (less $Cl_2$).

Finally, generally, the process according to the invention permits control of the system by control of the temperatures at the various critical points in the process, which is a major advantage in carrying out the subject process.

This example thus constitutes verification in respect of the contribution of the process of the invention to the state of the art and the advantages thereof, as follows:

(i) both from the point of view of technology (smaller apparatuses with a higher level of performance, as permitted by the very high reaction mechanisms);

(ii) from the energy point of view: in accordance with the prior art processes, it is necessary to compensate for the dilution effect due to the excess of air, and therefore the drop in temperature, by a higher level of consumption of combustible or fuel material; and (iii) from the point of view of quality of depollution, by virtue of the elevated incineration temperatures guaranteeing complete rapid combustion.

(2) Chemistry in general: the following Table sets forth a non-exhaustive list of possible uses.

One area of chemistry is gasification. The apparatus according to the invention may advantageously replace other known apparatuses of the type referred to as the entrained bed type.

TABLE

Figure 5:
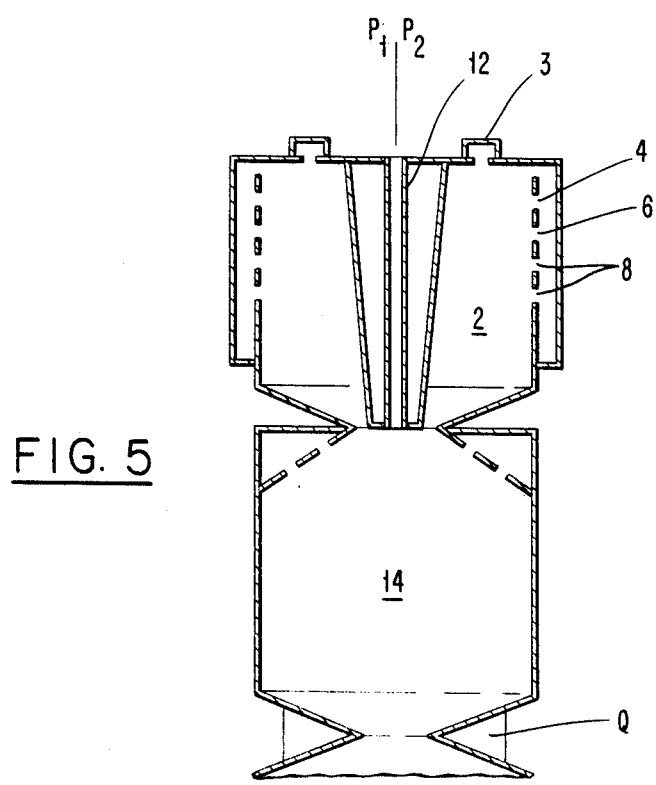

| | FEED TO THE APPARATUS OF | | | PHYSICAL-CHEMICAL REACTIONS | | REMARKS |
|---|---|---|---|---|---|---|
| No. | (4) | (3) | (12) | in (2) | in (14) | (Cf. FIG. 5) |
| 1 | Air and/or $O_2$ | $H_2$ | Nothing and/or vapor and/or liquid $H_2O$ | Combustion $H_2$ in $O_2$ | Generation of superheated steam (or hot gases) | Possibly $P_1$, $P_2$, by tube (12) |
| 2 | Air and/or $O_2$ | Gaseous hydrocarbon (HC) (or $H_2$) | Nothing | Combustion HC (or $H_2$) in $O_2$ | Generation of hot gases | — |
| 3 | Air and/or $O_2$ | Gaseous hydrocarbon (HC) (or $H_2$) | Solution in suspension | Combustion HC (or $H_2$) in $O_2$ | Concentration, drying or heat treatment of the axial phase ($P_1$, $P_2$) | — |
| 4 | Air and/or $O_2$ | Gaseous hydrocarbon (HC) (or $H_2$) | Liquid HC and/or fine solid combustion dispersible by "fluidized transport" (water, liquid HC, $CO_2$ and/or gas . . .) | Combustion HC (or $H_2$) in $O_2$ | Combustion by "pulvaporization" (vaporizing atomization) of the axial phase. Possible make-up of combustion-supporting agent at zone 14 | Optionally, quenching in accordance with Q |
| 5 | Air and/or $O_2$ | Gaseous hydrocarbon (HC) (or $H_2$) | Liquid HC | Combustion $H_2$ in $O_2$ with $H_2$ in excess | Steam cracking | Optionally quenching in accordance with Q |
| 6 | Air and/or $O_2$ | Gaseous hydrocarbon (HC) (or $H_2$) | $CH_4$ advantageously | Combustion $H_2$ in $O_2$ with $H_2$ in excess | Production of $C_2H_2$ | (12) As in FIGS. 3 and 4. Q immediately downstream of (14) - (very short residence time in (14)) |
| 7 | Air and/or $O_2$ | Gaseous hydrocarbon (HC) (or $H_2$) | Liquid polluted by combustible pollutants (for example, salt water with organic | Combustion HC and/or $H_2$ in $O_2$ with excess of $O_2$ (and/or air) | Combustion of the organic residues and separation of salts if present | Q for washing the depolluted salts or separation of the dry salts (filters) |

TABLE-continued

| | FEED TO THE APPARATUS OF | | | PHYSICAL-CHEMICAL REACTIONS | | REMARKS |
|---|---|---|---|---|---|---|
| No. | (4) | (3) | (12) | in (2) | in (14) | (Cf. FIG. 5) |
| 8 | Air and/or $O_2$ | Gaseous hydrocarbon (HC) (or $H_2$) | materials) Residual solvents which may or may not be chlorinated, brominated, flourinated | Combustion HC and/or $H_2$ in $O_2$ with excess of $O_2$ (and/or air) | Combustion with production of HCl, HBr | $P_1$, $P_2$, etc... may contain dioxin or precursors (for example, chlorobenzenes), Q for quench avoiding the presence of free halogens in the effluents |
| 9 | $Cl_2$ (as issuing from hydrolysis or "inerts" from liquefaction of $Cl_2$) | $H_2$ slight excess | Water, dilute hydrochloric solution or hydrochloric solution whose concentration is in equilibrium in (14) with the gases at the temperature attained | $Cl_2 + H_2 \rightarrow 2$ HCl + slight excess of $H_2 \rightarrow$ HCl gas | Absorption of HCl in the water, in the dilute solution and/or cooling of the HCl gas obtained | — |
| 10 | $Cl_2$ (as issuing from hydrolysis or "inerts" from liquefaction of $Cl_2$) | $H_2$ slight excess | Aqueous solution $P_2O_5$ | $Cl_2 + H_2 \rightarrow 2$ HCl + slight excess of $H_2 \rightarrow$ HCl gas | Concentration of $P_2O_5$ | Concerned with the solutions of $P_2O_5$ produced by hydrochloric attack on phosphates |
| 11 | $Cl_2$ diluted by inert matter from a liquefaction operation | $H_2$ in excess with respect to the chlorine and the $O_2$ of the inert matter | Hydrochloric solution by cooling and absorption | $Cl_2 + H_2 \rightarrow 2$ HCl + slight excess of $H_2 \rightarrow$ HCl gas (+ inert matter) | Cooling and absorption | — |
| 12 | $Cl_2$ in excess | $H_2$ | Liquid (or gaseous) HC | $Cl_2 + H_2 \rightarrow$ HCl + $Cl_2$ in excess | Vaporization and direct chlorination of HC to to give chlorinated solvents (in particular CV) | Q = heavy chlorinated solvents and/or aqueous hydrochloric solution for quenching of the chlorination reactions to increase selectivity in respect of vinyl chloride monomer in particular |
| 13 | $Cl_2$ | $H_2$ in excess | Residual heavy chlorinated solvents | $Cl_2 + H_2 \rightarrow$ HCl + $Cl_2$ in excess ($H_2$ in excess) | Hot vapor phase hydrogenation of the heavy solvents | Q for quenching before separation |
| 14 | $Cl_2$ | $H_2$ in excess | Chlorinated solvents to be burned in secondary air | $Cl_2 + H_2 \rightarrow$ HCl + $Cl_2$ in excess ($H_2$ in excess) | Complete combustion | A = air or oxygen Q = cooling and absorption quenching. The choice of the chlorine in (4) makes it possible to increase the partial pressure of HCl in (14) and thus to facilitate absorption in the fluid Q. |

In order to further illustrate the present invention and the advantages thereof, the following specific example is given, it being understood that same is intended only as illustrative and in nowise limitative.

EXAMPLE

This Example illustrates the various advantages of the process according to the invention, in particular as regards the options relating to miniaturization, the attainment of high reaction densities and high temperatures.

In an apparatus fabricated from non-refractory stainless steel (which was water-cooled) as shown in FIG. 4 of the accompanying drawings, wherein the volume of chamber 2 was 0.45 liter, the outside diameter was 150 mm and the length provided for development of the flame was 8 cm, complete combustion of 8 kg/hour of methane was carried out in 170 kg/hour of air. Melting of a stainless steel rod was then observed, which indicated a flame temperature of at least 1550° C. For a drive pressure on the methane of 0.3 atmosphere and on the air of 0.25 atmosphere, it was observed that there was established a very rapidly rotating blue flame which impinged against the bottom of the apparatus, its length being dependent on the gas flow rate.

The cooling water flow rate was 400 kg/hour, the cooling water entering at 17° C. and issuing at 25° C., indicating a thermal loss of 3.7 kW (equivalent to 0.27 kg/hour of methane, namely, 3.35% by weight).

The mean speed of the combustion gases in the chamber 2 was 35 m/s and 200 m/s in the discharge throat.

The overall reaction time was therefore on the order of two thousandths of a second and the energy density can thus be evaluated as being 250 megawatts/m$^3$.

Also, no fouling of the reaction walls was detected.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for bringing into contact at least two compounds in gaseous form prior to reacting said gaseous compounds in a reaction zone, comprising the steps of:
   dividing a first gaseous compound by first orifices into a plurality of first separate flowstreams,
   dividing a second gaseous compound by second orifices into a plurality of second separate flowstreams,
   injecting said first and second flowstreams separately into a mixing chamber containing a rigid central core defined by a longitudinally extending closed wall which closes off an interior of said central core relative to said mixing chamber and said reaction zone,
   said first and second flowstreams being separately injected in crossflow relationship within said mixing chamber laterally outside of, and concentrically around, said central core such that said first and second flowstreams intersect and become mixed into complementary elementary unit volumes disposed around said central core upstream of a downstream end of said central core; and
   conducting said elementary unit volumes downstream toward said reaction zone.

2. The process as defined by claim 1, at least one of said first and second flowstreams comprising a combustible material and at least one other flowstream comprising a combustion-supporting agent.

3. The process as defined by claim 1, comprising cooling said central core.

4. A process according to claim 1 wherein said first flowstreams travel in a downstream direction and said second flowstreams travel in a laterally inward direction when intersecting one another in said mixing chamber.

5. A process according to claim 1 wherein at least one additional second flowstream is introduced downstream of initially-introduced second flowstreams for eliminating any stoichiometric deficiency of said second compound.

6. The process as defined by claim 1, at least one of said flowstreams serving to entrain said first and second elementary unit volumes.

7. The process as defined by claim 6, comprising imparting an axially symmetrical helical vortex motion to at least one of said first and second flowstreams, at a rate of flow of gaseous phase as to entrain the other flowstreams therein.

8. A phase contactor for bringing into contact at least two compounds in gaseous form prior to reacting said gaseous compounds in a reaction zone, comprising:
   first orifice means for dividing a first gaseous compound into a plurality of first separate flowstreams,
   second orifice means for dividing a second gaseous compound into a plurality of second separate flowstreams,
   a mixing chamber and a reaction zone disposed downstream thereof,
   a rigid core disposed in a center of said mixing chamber and defined by a longitudinally extending closed wall which closes off an interior of said central core relative to said mixing chamber and said reaction zone,
   means for separately injecting said first and second flowstreams separately into said mixing chambers in crossflow relationship laterally outside of, and concentrically around, said central core such that said first and second flowstreams intersect and become mixed into complementary elementary unit volumes disposed around said central core upstream of a downstream end of said central core, whereby said elementary unit volumes are conducted downstream toward said reaction zone around the outside of said core.

9. The phase contactor of claim 8 including means for imparting an axially symmetrical helical vortex configuration to at least one of said first and second gaseous flowstreams.

10. The phase contactor according to claim 8 including means for cooling said core.

11. A process for bringing into contact at least two compounds in gaseous form prior to reacting said gaseous compounds in a reaction zone, comprising the steps of:
   dividing a first gaseous combustible material into a plurality of first flowstreams,
   dividing a second gaseous combustible-supporting agent into a plurality of second flowstreams,
   introducing said first and second flowstreams separately into a mixing chamber containing a rigid central core defined by a longitudinally extending closed wall which closes off an interior of said central core relative to said mixing chamber and said reaction zone,
   said first and second flowstreams being introduced in crossflow relationship within said mixing chamber laterally outside of, and concentrically around, said central core such that said first and second flowstreams intersect and become mixed into complementary elementary unit volumes disposed around said central core upstream of a downstream end of said central core;
   conducting said elementary unit volumes downstream toward said reaction zone, and
   progressively supplying said combustion-supporting agent, firstly in a stoichiometric deficit and ultimately in essentially stoichiometric amount.

12. A process for bringing into contact at least two compounds in gaseous form prior to reacting said gaseous compounds in a reaction zone, comprising the steps of:
   dividing a first gaseous compound into a plurality of first flowstreams,
   dividing a second gaseous compound into a plurality of second flowstreams,
   introducing said first and second flowstreams separately into a mixing chamber containing a rigid central core defined by a longitudinally extending closed wall which closes off an interior of said central core relative to said mixing chamber and said reaction zone, said first and second flowstreams being introduced in crossflow relationship within said mixing chamber laterally outside of, and concentrically around, said central core such that said first and second flowstreams intersect and become mixed into complementary elementary unit volumes disposed around said central core upstream of a downstream end of said central core;

conducting said elementary unit volumes downstream toward said reaction zone, and cooling said central core.

13. A process for bringing into contact at least two compounds in gaseous form prior to reacting said gaseous compounds in a reaction zone, comprising the steps of:

dividing a first gaseous compound into a plurality of first flowstreams, dividing a second gaseous compound into a plurality of second flowstreams, introducing said first and second flowstreams separately into a mixing chamber containing a rigid central core defined by a longitudinally extending closed wall which closes off an interior of said central core relative to said mixing chamber and said reaction zone, said first and second flowstreams being introduced in crossflow relationship within said mixing chamber laterally outside of, and concentrically around, said central core such that said first and second flowstreams intersect and become mixed into complementary elementary unit volumes disposed around said central core upstream of a downstream end of said central core;

conducting said elementary unit volumes downstream toward said reaction zone, and introducing at least one additional second flowstream downstream of initially-introduced second flowstreams for eliminating any stoichiometric deficiency of said second compound.

14. A phase contactor for bringing into contact at least two compounds in gaseous form prior to reacting said gaseous compounds in a reaction zone, comprising:

means for dividing a first gaseous compound into a plurality of first flowstreams, means for dividing a second gaseous compound into a plurality of second flowstreams, a mixing chamber and a reaction zone disposed downstream thereof, a rigid core disposed in a center of said mixing chamber and defined by a longitudinally extending closed wall which closes off an interior of said central core relative to said mixing chamber and said reaction zone, means introducing said first and second flowstreams separately into said mixing chamber in crossflow relationship laterally outside of, and concentrically around, said central core such that said first and second flowstreams intersect and become mixed into complementary elementary unit volumes disposed around said central core upstream of a downstream end of said central core, whereby said elementary unit volumes are conducted downstream toward said reaction zone around the outside of said core, and means for cooling said core.

* * * * *